United States Patent
Kokkonen

(10) Patent No.: US 12,485,507 B2
(45) Date of Patent: Dec. 2, 2025

(54) METHOD OF MANUFACTURING TUBULAR HOLLOW PROFILE VEHICLE FRAME PARTS

(71) Applicant: POLE BICYCLE COMPANY OY, Vaajakoski (FI)

(72) Inventor: Leo Kokkonen, Jyväskylä (FI)

(73) Assignee: MAHTISONNI OY, Jyväskylä (FI)

( * ) Notice: Subject to any disclaimer, the term of this patent is extended or adjusted under 35 U.S.C. 154(b) by 0 days.

(21) Appl. No.: 18/575,991

(22) PCT Filed: Jul. 1, 2022

(86) PCT No.: PCT/EP2022/068293
§ 371 (c)(1),
(2) Date: Jan. 2, 2024

(87) PCT Pub. No.: WO2023/275367
PCT Pub. Date: Jan. 5, 2023

(65) Prior Publication Data
US 2024/0308005 A1    Sep. 19, 2024

(30) Foreign Application Priority Data
Jul. 2, 2021  (FI) ...................................... 20215781

(51) Int. Cl.
*B23P 15/00*    (2006.01)
*B62K 19/06*    (2006.01)
(Continued)

(52) U.S. Cl.
CPC .............. *B23P 15/00* (2013.01); *B62K 19/06* (2013.01); *B62K 19/20* (2013.01); *B62K 19/28* (2013.01)

(58) Field of Classification Search
CPC ........ B62K 21/12; B62K 21/18; B62K 21/20; B62K 21/22; B62K 21/24;
(Continued)

(56) References Cited

U.S. PATENT DOCUMENTS 3,429,700 A * 2/1969 Salter ...................... B22F 7/062
                                                    416/212 R
3,550,253 A * 12/1970 Frey ........................ B21C 37/28
                                                    228/178
(Continued)

FOREIGN PATENT DOCUMENTS

CN         106826096 B    8/2018
EP          1647475 A2    4/2006

OTHER PUBLICATIONS

International Search Report for PCT/EP2022/068293 dated Oct. 24, 2022, 4 pages.
(Continued)

Primary Examiner — Jason L Vaughan
(74) Attorney, Agent, or Firm — NIXON & VANDERHYE, PC

(57) ABSTRACT

A method for manufacturing a hollow vehicle frame part includes: removing material from a first side of a first billet to create a first inner shape of a target vehicle frame such a substantially angled faying surface remains adjacent to the first inner shape; removing material from a first side of a second billet to create a second inner shape, such that a substantially angled faying surface is left on the first side of the second billet adjacent to the second inner shape; bonding the first and second billets together at the faying surfaces such that the first and second inner shapes face each other and such that the angled faying surfaces together form a bevel-type joint; after bonding, removing material by
(Continued)

machining from the second sides of the first and second billets to create target outer shape of the vehicle frame part.

15 Claims, 6 Drawing Sheets

(51) Int. Cl.
*B62K 19/20* (2006.01)
*B62K 19/28* (2006.01)

(58) Field of Classification Search
CPC ......... Y10T 29/49622; Y10T 29/49625; Y10T 29/49627; Y10T 29/49893; Y10T 29/49995; B23P 2700/50
See application file for complete search history.

(56) References Cited

U.S. PATENT DOCUMENTS

| | | | | |
|---|---|---|---|---|
| 3,772,750 | A * | 11/1973 | Hauser | B23P 15/00 29/899.1 |
| 4,322,087 | A * | 3/1982 | Addicks | B62K 21/12 403/191 |
| 4,616,949 | A * | 10/1986 | Kellner | B62K 21/12 403/373 |
| 4,790,472 | A * | 12/1988 | Bunkoczy | B65D 88/04 228/171 |
| 6,035,741 | A * | 3/2000 | Krizman, Jr. | B62K 21/12 74/551.8 |
| 6,343,891 | B1 * | 2/2002 | Combs | F16B 7/0493 403/385 |
| 7,131,350 | B2 * | 11/2006 | McColligan | B62K 21/12 403/375 |
| 7,407,176 | B2 * | 8/2008 | McJunkin | B62K 21/12 280/279 |
| 7,500,415 | B2 * | 3/2009 | Thomson | B62K 19/36 74/551.8 |
| 2002/0157499 | A1 * | 10/2002 | Liao | B62K 21/12 74/551.1 |
| 2003/0221509 | A1 * | 12/2003 | Lin | B62K 21/12 74/551.1 |
| 2005/0091825 | A1 * | 5/2005 | Fuks | B21K 21/00 29/463 |
| 2008/0048410 | A1 | 2/2008 | Lin | |
| 2009/0083981 | A1 | 4/2009 | Wanne | |
| 2009/0229404 | A1 * | 9/2009 | Wilkerson | B62K 21/12 74/551.3 |
| 2012/0297922 | A1 * | 11/2012 | Cote | B62K 21/125 74/551.3 |
| 2013/0263689 | A1 * | 10/2013 | Robinson | G05G 1/12 74/548 |
| 2013/0337285 | A1 * | 12/2013 | Gruber | B23K 26/38 428/595 |

OTHER PUBLICATIONS

Written Opinion of the ISA for PCT/EP2022/068293 dated Oct. 24, 2022, 7 pages.

* cited by examiner

METHOD OF MANUFACTURING TUBULAR HOLLOW PROFILE VEHICLE FRAME PARTS

CROSS-REFERENCE TO RELATED APPLICATIONS

This application is the U.S. national phase of International Application No. PCT/EP2022/068293 filed Jul. 1, 2022 which designated the U.S. and claims priority to FI Patent Application No. 20215781 filed Jul. 2, 2021, the entire contents of each of which are hereby incorporated by reference.

FIELD OF THE INVENTION

Generally, the present invention relates to manufacturing vehicle frame structures thereof. Particularly, however not exclusively, the present invention pertains to a method for manufacturing tubular hollow profile vehicle frames and a frame structure product thereof.

BACKGROUND

Contemporary bicycle frames made from metal alloy, such as steel or aluminum alloy, are commonly manufactured with the help of CNC-machining. For producing tubular structures for a bicycle frame part, such as the front frame or rear frame may be manufactured from aluminum by pre-forming two parts of the frame part into tubular shape, which are then joined together to form a single tubular hollow profile frame part. Commonly, the parts are joined together at the seams by welding. However, welding requires high accuracy, be it manual or robotic, in addition to which such a welded frame must in many cases be aligned, heat treated and post-machined to be suitable for high quality bicycle frame applications.

Alternatively, an aluminum bicycle frame may be manufactured by bonding two pre-formed tubular shape frame parts together at their respective faying surfaces with a bonding adhesive. This technique however has the disadvantage that two parts must be pressed together while curing the bonding adhesive. The pressing of the parts may be achieved by a mechanical jig, screws or such clamping means, which may be difficult to set with accuracy, such that the frame parts are joined together accurately with even pressure along the seam. In many cases, such bonding may be inferior in strength since there may be imperfections at the bonding of the seam. Additionally, the same imperfections as well as glue squeezed from the seam may need to be machined after bonding of the frame parts. Moreover, some of the used manufacturing techniques are limited in view of the frame shapes that may be manufactured.

Since high performance vehicle frames aim for optimal structures in terms of strength to weight ratio the wall thickness of the frame profile is kept as thin as possible. This sets a further difficulty for connecting two pre-formed frame parts to each other and then machining the frame part consisting of the two parts.

SUMMARY OF THE INVENTION

The objective of the embodiments of the present invention is to at least alleviate one or more of the aforementioned drawbacks evident in the prior art techniques particularly in the context of bicycle frame manufacturing methods. The objective is generally achieved with a method in accordance with the present disclosure.

A technical advantage of the present invention is that it allows for manufacturing tubular vehicle frame structures with hollow and thin-walled profiles, which can be machined to substantially high engineering tolerances. Further, the method is highly usable for creating vehicle frame structures wherein stiffness to weight ratio is an important design aspect, and sufficient engineering tolerances as well as structural robustness need to be met. The products manufactured with the method may include especially bicycle frames but also other light and medium size human-powered and motorpowered vehicle frames.

Even further, the present method may be used to manufacture smooth-surface vehicle frames with continuous curvilinear profiles. This is enabled by the specific bevel-type joint formed at and between the billet parts whereat the billet parts are bonded and the manufacturing method in which it is applied.

In accordance with one aspect of the present invention a method for manufacturing a hollow vehicle frame part comprising removing material from a first side of a first billet to create a first inner shape of a target vehicle frame and wherein material is removed from the first side of said first billet such that at least one substantially angled faying surface is left on said first side of said first billet adjacent to the first inner shape, removing material from a first side of a second billet to create a second inner shape of a target vehicle frame and wherein material is removed from the first side of said second billet such that at least one substantially angled faying surface is left on said first side of said second billet adjacent to the second inner shape, bonding the first billet and the second billet together at the faying surfaces on first sides of the first and second billets such that the first and second inner shapes face each other and such that the angled faying surfaces together form a bevel-type joint, after bonding, removing material by machining from the second side of the first billet and from the second side of the second billet to create target outer shape of the vehicle frame part.

According to an exemplary embodiment of the present invention the faying surfaces comprise angles such that when the faying surfaces are bonded together the complementary sum of the angles of the faying surfaces is 90 degrees.

According to an exemplary embodiment of the present invention material is removed from the first sides of the first billet and second billet such that an amount of material remains in the second sides of the first billet and second billet before bonding and removing material from the second sides of the first billet and second billet.

According to an exemplary embodiment of the present invention material is removed from the first sides of the first billet and second billet such that an amount of material remains outside of the faying surfaces on the first sides of the first billet and second billet before bonding and removing material from the second sides of the first billet and second billet.

According to an exemplary embodiment of the present invention material is removed from the first and second sides of the first and second billets such that the target shape of the vehicle frame part has a wall thickness of 0.1-8 mm.

According to an exemplary embodiment of the present invention material is removed from the first and second sides of the first and second billets such that the target shape of the vehicle frame part has a wall thickness of approximately 1 millimeter.

According to an exemplary embodiment of the present invention at or after bonding the combined block of the first billet and the second billet is attached to a jig for machining any of the second sides of the first and second billets.

According to an exemplary embodiment of the present invention the first and/or second billet are pre-formed by cold-forging, casting or printing to form a first and/or second inner shape, after which the first and/or second inner shape is machined.

According to an exemplary embodiment of the present invention the first side of the first and/or second billet are shot-peened.

According to an exemplary embodiment of the present invention the first and/or second inner shape surface is treated by coating, anodizing, coloring or passivating.

According to an exemplary embodiment of the present invention mechanical fastening means through the first billet and second billet at non-machined parts of the first billet and second billet are used for setting and holding the first billet and second billet in relation to each other for bonding.

According to an exemplary embodiment of the present invention mechanical fastening means are used to fasten the billets to a jig for machining.

According to an exemplary embodiment of the present invention xyz-coordinate zero points and their relation to one or more sides of a billet and inner shape geometry are determined for each inner shape at or after forming each inner shape.

According to an exemplary embodiment of the present invention in the method the billets are aluminum alloy billets.

According to further exemplary embodiments of the present invention in the method may comprise more billets than the first and second billets, which may be regarded as third, fourth etc. billets. The method then comprises removing material from a first side of the third, fourth, or such billet, which first side is substantially flat, to create a third, fourth etc. inner shape of a target vehicle frame and wherein material is removed from the first side of said third, fourth etc. billet such that at least one faying surface is left on said first side of said third, fourth etc. billet adjacent to the third, fourth etc. inner shape.

In accordance with one aspect of the present invention the use of method for manufacturing a bicycle frame part.

In accordance with one aspect of the present invention a bicycle frame part manufactured by the method.

The method may be used to manufacture various tubular hollow profile vehicle parts, such as bicycle front frames and rear frames. However, a person skilled in the art will be able to appreciate that the method may be used to manufacture various other vehicle frame parts, which are not explicitly disclosed but arise in various different applications.

As briefly reviewed hereinbefore, the utility of the different aspects of the present invention arises from a plurality of issues depending on each particular embodiment.

The expression "a number of" may herein refer to any positive integer starting from one (1). The expression "a plurality of" may refer to any positive integer starting from two (2), respectively.

The term "exemplary" refers herein to an example or example-like feature, not the sole or only preferable option.

Different embodiments of the present invention are also disclosed in the attached dependent claims.

BRIEF DESCRIPTION OF THE DRAWINGS

Some exemplary embodiments of the present invention are reviewed more closely with reference to the attached drawings, wherein.

DETAILED DESCRIPTION OF THE EMBODIMENTS

Figure 1:
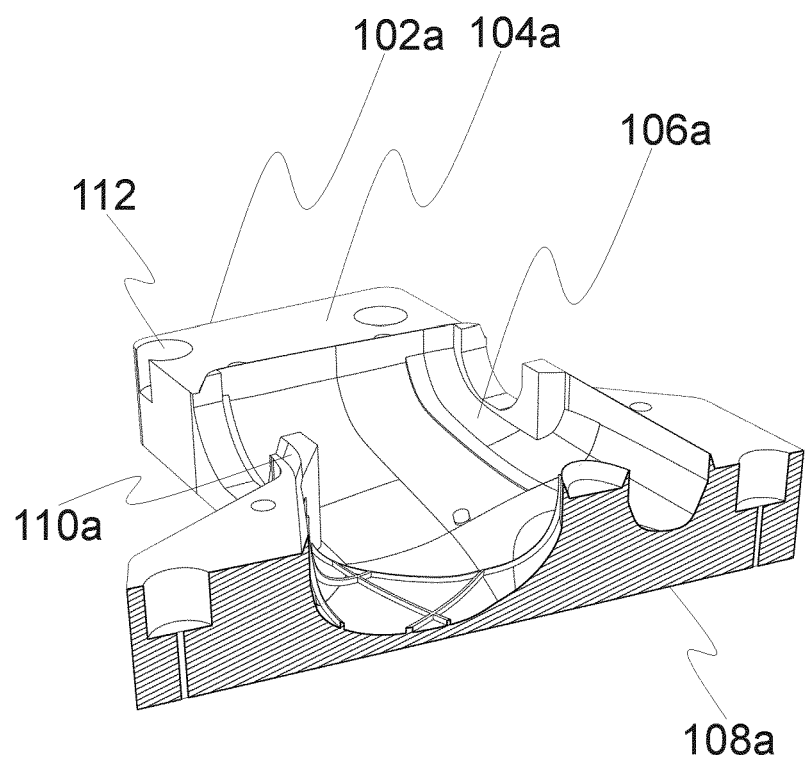
FIG. 1 illustrates the machined first billet in accordance with an embodiment of the present invention.

FIG. 1 illustrates the first billet (102a) after machining of the first inner shape (106a). For the present method, the initially plate-like first billet (102a) is first pre-formed by machining a first side (104a) to create the hollow inner shape of a first elongated hollow frame half constituting a first inner shape (106a). The shape may be determined in view of the target vehicle frame part profile and dimensions. The inner shape is machined to the first billet (102a) such that a beveled surface is left as a faying surface whereat the first billet (102a) may be bonded with a second billet (102b). In this embodiment, a bevel-type joint rim (110a), comprising a faying surface at an angle is formed to the outer rim of the first inner shape (106a) which may be mated with a matching bevel or chamfer shape. Boring holes (112) (only one numbered as an example) of such mechanical fastening means may be formed through the first billet (102a) at the peripheries of the billet, i.e. at the areas that don't coincide or situate too close to the first inner shape (106a) at which boring holes (112) the first billet (102a) may be attached to a jig (114) for machining.

Figure 2:
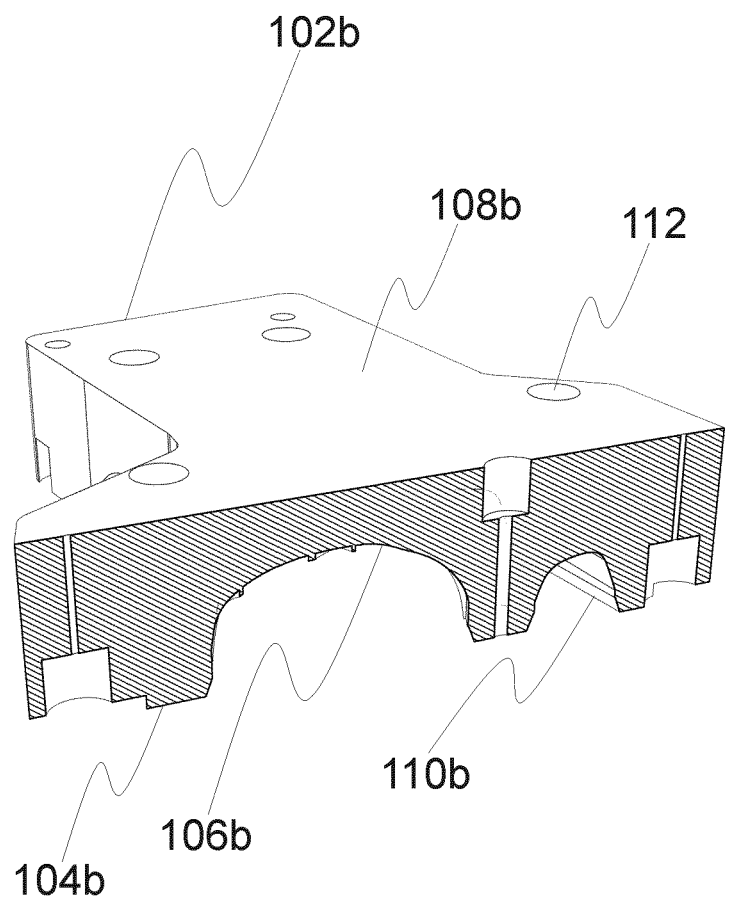
FIG. 2 illustrates the machined second billet in accordance with an embodiment of the present invention.

FIG. 2 illustrates a machined second billet (102b). For the present method, the initially plate-like second billet (102b) is first pre-formed by machining a first side (104b) to create the hollow inner shape of a second elongated hollow frame half constituting a second inner shape (106b). The shape may be determined in view of the target vehicle frame part profile and dimensions, and in view of the dimensions of the inner shape and/or faying surfaces of the first billet (102a). The inner shape is machined to the second billet (102b) such that a beveled surface is left as a faying surface whereat the second billet (102b) may be bonded with the first billet (102a). In this embodiment, a bevel-type joint groove or chamfer (110b), comprising a faying surface at an angle, is formed to the edge of the second inner shape (106b) which may be mated with a matching bevel-type joint rim (110a) of the first inner shape (106a). The faying surfaces of the opposing parts may be of the same angle or different angles such that when bonded together the complementary sum of the angles of the faying surfaces is 90 degrees. Boring holes (112) may be formed through the second billet (102b) at the peripheries of the billet, i.e. at the areas that don't coincide or situate too close to the second inner shape (106b) at which boring holes (112) the second billet (102b) may be attached to a jig (114) for machining. The boring holes (112) of both the first billet (102a) and second billet (102b) may be formed such that holes (112) coincide when the inner shapes (106a, 106b) of the billets (102a, 102b) are set to face each other.

The first billet (102a) and second billet (102b) comprise a material that may be machined comprising for example metal or metal alloy. Some feasible examples include aluminum alloys 6061-T6, 7005-T6 and 7075-T6. The billets (102a, 102b) may be plate-like, cuboid, cylindrical shape, or some other shaped block of solid material of any sufficient shape, thickness, dimensions and surface shapes. The billets (102a, 102b) may also be parts that are printed with optimal pre-formation. The faying surfaces (110a, 110b) are preferably machined or they may be otherwise pre-formed to form a bevel-type joint (110ab) defined by the first inner shape (106a) and the second inner shape (106b) set against each other, such that the faying surfaces face each other, and optionally additionally a number of surfaces on first side (104a, 104b) on either billet (102a, 102b).

Pre-forming may be used to treat the billets (102a, 102b) before machining. For example, cold-forging and casting may be used to shape and treat the billets (102a, 102b), which may be used to reduce the amount of machining needed or to treat the material. Also, techniques may be used to treat the first side (104a, 104b) surfaces and the inner shape surfaces after removal of material. Such techniques include shot-peening, coloring, anodization, passivation and coating, such as Aluminum Oxide Coating, and the like corrosion resistance treatment techniques. Such treatment techniques may be very harsh since the outer surface of the target frame part hasn't yet been formed. This additionally means that inner shape surfaces may be treated independently and from the frame part outer surfaces.

A CNC (computer numerical control) machining device is preferably used for the machining operations but also other such machining techniques may be used as feasible in view of e.g. engineering tolerance requirements. However, also other machining means, such as manual machining means may be possible in limitations of the required accuracy and tolerances of the target design requirements. Machining is preferably used to remove substance material from the billets (102a, 102b) as well as any residue from the bonding seams, such as removing any bonding material extruding from the profile or outer wall of the target part that is being manufactured.

Figure 3:
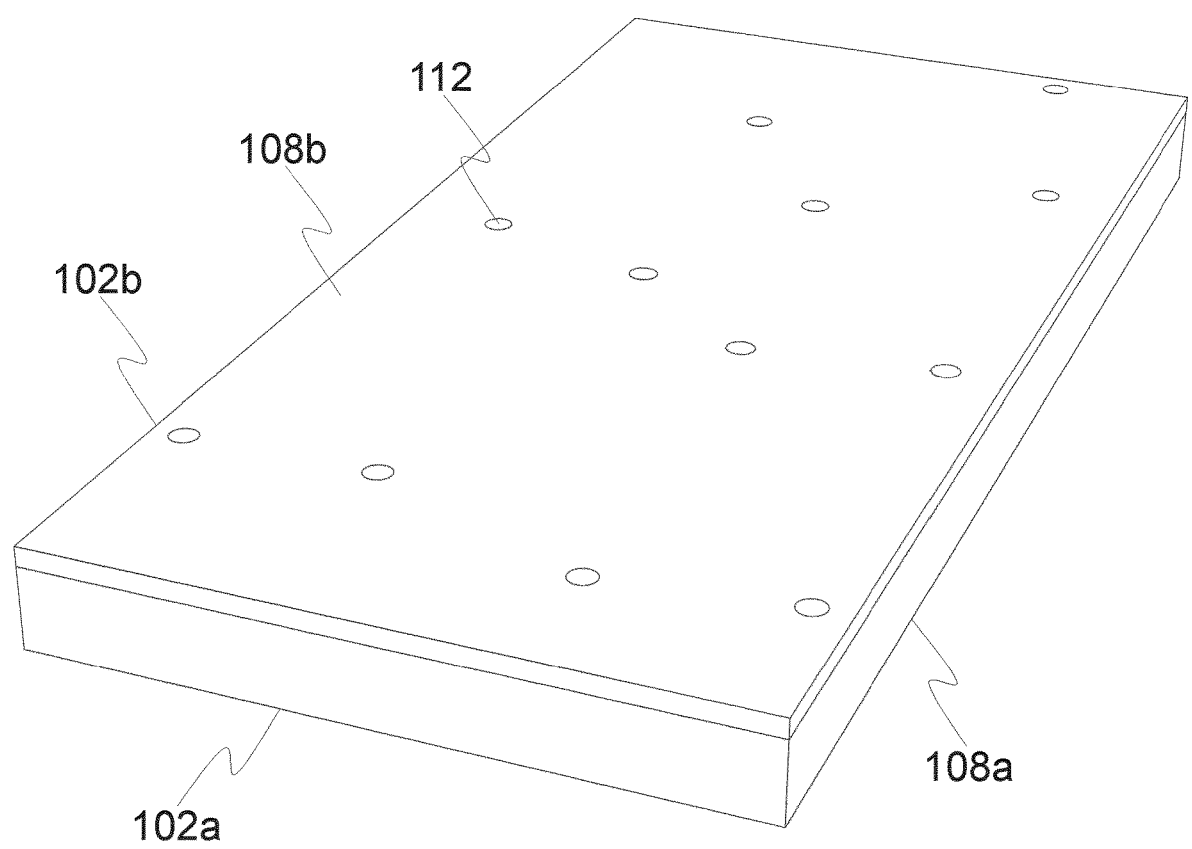
FIG. 3 illustrates an axonometric view of the first and second billets combined together in accordance with an embodiment of the present invention.

FIG. 3 illustrates an axonometric view of the first (102a) and second billets (102b) combined together. The first billet (102a) and second billet (102b) are joined together by bonding the first billet (102a) and the second billet (102b) together at the faying surfaces (110a, 110b) on first sides (104a, 104b) of the first billet (102a) and second billet (102b) such that the first inner shape (106a) and second inner shape (106b) face each other. Preferably an amount of material remains in the second sides (108a, 108b) of the first billet (102a) and second billet (102b) before bonding and removing material from the second sides (108a, 108b) of the first billet (102a) and second billet (102b) as illustrated. Preferably also an amount of material remains outside of the faying surfaces on the first sides (104a, 104b) of the first billet (102a) and second billet (102b) before bonding and removing material from the second sides (108a, 108b) of the first billet (102a) and second billet (102b) as illustrated. Because the billets (102a, 102b) have more material than the final target vehicle frame part shape the billets (102a, 102b) may be compressed together from various preferred points and the amount of material helps to stiffen the structure while bonding. This also helps to reduce movement and vibration of the structure while machined from the seams and the second sides (108a, 108b) of the first billet (102a) and second billet (102b).

As illustrated and meant herein throughout, the second sides (108a, 108b) of the billets comprise the all one or more outer sides of the billets, which sides are not the first sides (104a, 104b) at which the billets are bonded together, and not only the sides opposite to the first sides (104a, 104b). Because billets may have different geometries the second sides (108a, 108b) are to be understood as to cover all the outer surfaces of the billets, which are machined to create target outer shape of the vehicle frame part.

The billets (102a, 102b) may be compressed against each other by boring holes (112) through the billets (102a, 102b) at the peripheries of the billets (102a, 102b), i.e. at the areas that don't coincide or situate too close to the inner shapes of the billets (102a, 102b). Via the holes (112) the billets (102a, 102b) may be both compressed against each other and fastened to a jig (114) for machining. Alternatively or additionally, clamping means may be used.

The mechanical fastening means and/or clamping means may be used to compress and hold the billets (102a, 102b) against each other while the bonding adhesive sets and cures.

For bonding, two-component adhesives, heat-activated adhesives and the like may be used. The adhesive may be applied to and along the faying surface (110b) of the bevel-type joint (110ab) such that when the other billet is pressed against the faying surface (110b) of the other billet the adhesive is squeezed and spread along the faying surface (110b) and its opposing surfaces of the faying surface (110a) of the bevel-type joint (110ab). Alternatively or additionally, the adhesive may be applied directly on either or separately on both faying surfaces.

The structure formed by the bonded billets (102a, 102b) may be attached to a jig (114) and the second side (108a) of the first billet (102a) may be machined to create one target outer shape of the vehicle frame part. The boring holes (112) surrounded by remaining billet may be left protruding before removal.

Further, the second side (108b) of the second billet (102b) may be machined to create a second target outer shape and essentially finalize the target shape of the vehicle frame part. Logos and other details such as connection points for links, bearings, load-bearing structures, derailleurs, seat posts, forks, brakes, hubs, bottle holders, and the like, as well as attachment means, such as screws and the like.

Figure 4:
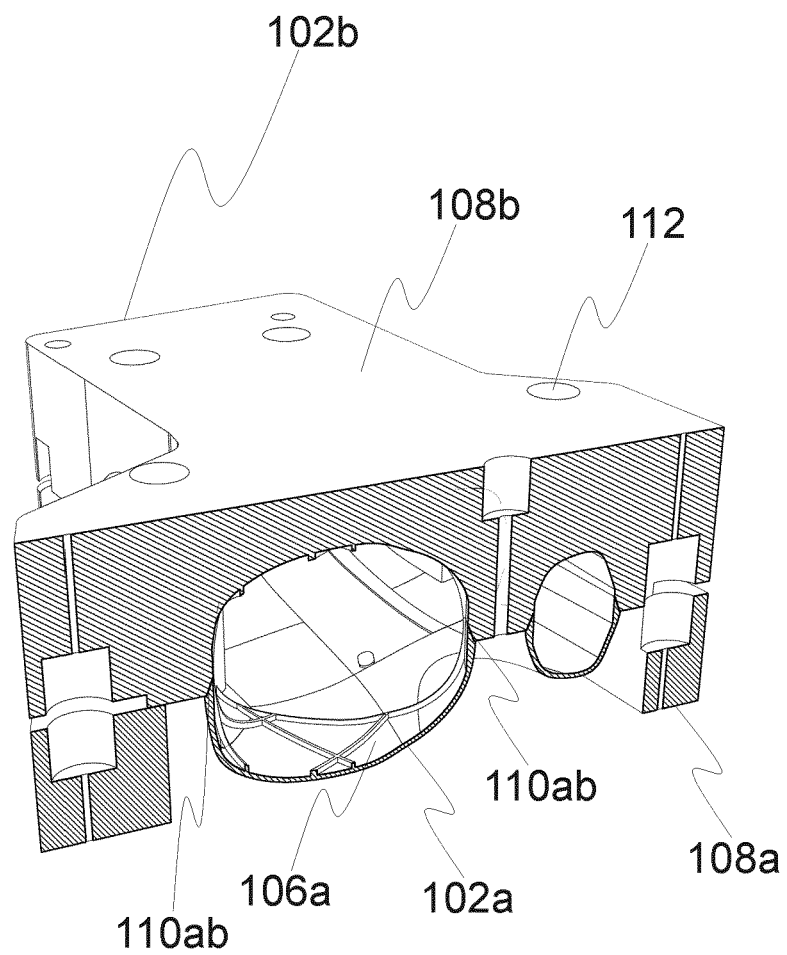
FIG. 4 illustrates a vehicle frame part product before the second side of the first billet and second side of the second billet have been machined in accordance with an embodiment of the present invention.

FIG. 4 illustrates a vehicle frame part connected to a jig (114) before the second side (108b) of the second billet (102b) has been machined. The final product may be machined and finished to remove any protruding adhesives or billet material.

Figure 5:
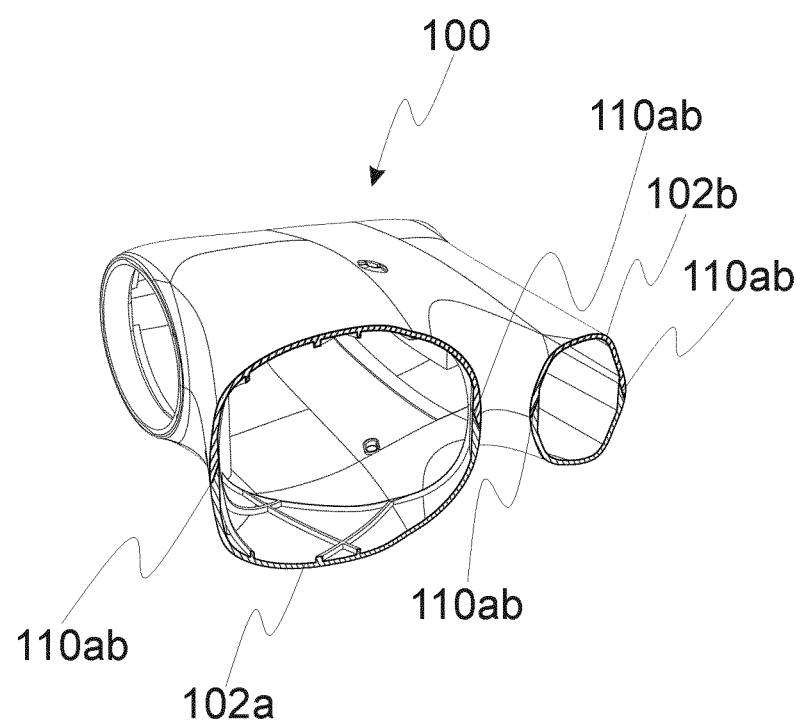
FIG. 5 illustrates a cutaway drawing of a bicycle frame part manufactured by the method in accordance with an embodiment the present invention.

FIG. 5 illustrates a cutaway drawing of a bicycle frame part (100) product manufactured by the method after the second sides (108a, 108b) of the first and second billet (102a, 102b) have been machined. The bicycle frame part (100) shown here is part of the front frame of a bicycle. As depicted, the vehicle frame part (100) attained with the method includes a hollow profile, which may be also tubular and have a substantially thin wall thickness, which wall thickness may be also variable along the frame part (100). The various shapes may include linear and curvilinear shapes via the longitudinal and vertical directions of the frame part (100) to attain various different kinds of shapes and surface textures and structures, such as protrusions, recesses, through holes, means for attaching components, and other such mechanical details. The wall-thickness may vary, even along the profile, and some examples of suitable wall-thickness comprise thicknesses from the range of 0.1-8 mm. One preferable wall-thickness is approximately 1 mm. However, the wall-thickness may be chosen in view of billet material, frame part geometry and frame part purpose.

The bevel-type joint (110ab) whereat the billets (102a, 102b) are joined comprises a faying surface (110b) at the second billet (102b) to which the faying surface (110a) of the first billet (102a) is set for bonding. The angles of the faying surfaces may be chosen in view of the embodiment, but the angles are both over 0 degrees but less than 90 degrees such that the sum of the angles is 90 degrees in the limits of the measuring parameters. The frame part may also comprise a portion with a higher wall-thickness at the location of the bevel-type joint (110ab), which portion may protrude from the overall frame part profile as illustrated. In this embodiment the cross-section of the frame profile forms a shape resembling a diamond. However, due to the bonding connection being a bevel-type joint (110ab) the outer profile may be machined to a smooth and continuous curvilinear profile allowing for a plurality of different frame part shapes. The bevel-type joint (110ab) provides a wide surface for the bonding adhesives and due to the shape also strength into various directions of the bonding connection. The faying surfaces are also easier to set to each other for bonding due to the matching angles of the faying surfaces making the bonding of the parts easier.

Figure 6:
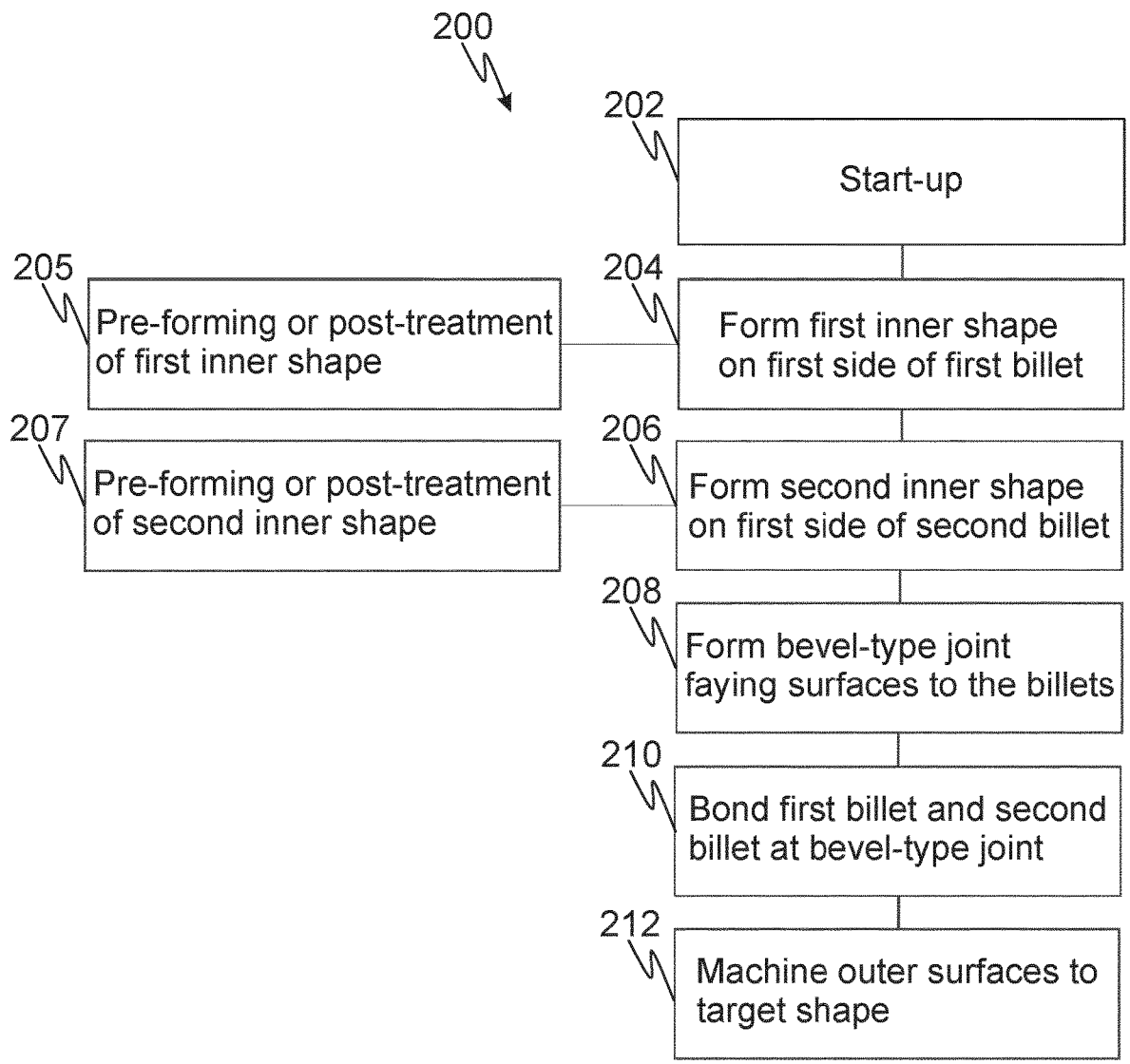
FIG. 6 depicts a flow diagram illustrating an embodiment of the method in accordance with the present invention.

FIG. 6 depicts a flow diagram illustrating an embodiment of the method (200) in accordance with the present invention.

At 202, referred to as the start-up billets may be fastened to a jig for machining.

At 204, the material is removed from a first side of a first billet to create a first inner shape of a target vehicle frame and wherein material is removed from the first side of said first billet such that at least one angled faying surface is formed on said first side of said first billet adjacent to the first inner shape. Hence, a first geometry for a bevel-type joint is formed to or adjacent to the first inner shape. The first side may be machined or otherwise pre-formed to comprise an inner shape of a vehicle frame product and the substantially angled faying surface to which a matching angled faying surface may be set against. As step 205, pre-forming or post-forming of the first inner shape and/or other parts of the first side may be carried out before, at or after creating the first inner shape. Also, the billet may be determined and assigned xyz-coordinate zero points and their relation to one or more sides of the billet in view of the formed inner shape geometry of the billet.

At 206, the material is removed from a first side of a second billet to create a second inner shape of a target vehicle frame and wherein material is removed from the first side of said second billet such that at least one angled faying surface is formed on said first side of said second billet adjacent to the second inner shape. The angle of this faying surface on the second billet is chosen to match the faying surface formed to the first billet. Hence, a second geometry for a bevel-type joint is formed to or adjacent to the second inner shape that fits with the first geometry, such that the billets may be set against each other so that angles of the faying surfaces match each other. The first side may be machined or otherwise pre-formed to comprise an inner shape of a vehicle frame product and the substantially angled faying surface to which a matching angled faying surface may be set against. As step 207, pre-forming or post-forming of the second inner shape and/or other parts of the first side may be carried out before, at or after creating the second inner shape. Also, the billet may be determined and assigned xyz-coordinate zero points and their relation to one or more sides of the billet in view of the formed inner shape geometry of the billet.

At 208, if not formed already while forming the first and second inner shapes, a first geometry for a bevel-type joint is formed to or adjacent to the first inner shape and a second geometry for a bevel-type joint is formed to or adjacent to the second inner shape that fits with the first geometry. The bevel-type geometry of the joint and its faying surfaces is preferably done while forming the first inner shape and the second inner shape but may be done separately as its own step. The first geometry may be for example a surface with an angle of 45 degrees or other angle, which may be mated with a surface with an angle of 45 degrees or other corresponding angle, such that the sum of the angles is 90 degrees. The two main faying surfaces of the bevel-type joint are defined by a faying surface in or protruding from and at the first side of a billet substantially angled and adjacent to a first inner shape, and an another angled faying surface at, in or protruding from the second inner shape. These faying surfaces are adjacent and at an angle to each other when mated together. The shape and geometry, e.g. the area, of the faying surfaces as well as the angle thereof may vary and be chosen in view of design requirements.

At 210, the first billet and the second billet are placed together at the faying surfaces on first sides of the first and second billets such that the first and second inner shapes face each other. The first and second billets are bonded together such as that their first and second geometries together form a bevel-type joint wherein at least one surface is used as a faying surface for bonding. Because the second sides of the billets haven't yet been machined the billets still have a substantially high amount of mass and thickness when compared to the final target shape of the frame part, which means that high amount of pressure may be used to compress the billets against each other for bonding. This means that more pressure may be used to compress the billets to each other than would be possible for a two ready-machined frame halves. Also, setting and keeping the frame parts in place and in preferred relation to each other is possible because of the sufficiently high pressure that may be used and because of the bevel-type joint geometry at the seams of the billets.

At 212, material is removed by machining from the second side of the first billet and from the second side of the second billet to create target outer shape of the vehicle frame part.

A person skilled in the art will be able to appreciate that some steps may be carried out coincidentally or at different orders. Further, although only two billets are depicted the method allows for use of a further number of billets. One or more of third, fourth, fifth, etc., billets removing material from a first side of the third, fourth, fifth or such billet, which first side is substantially flat, to create third, fourth, fifth or such, inner shape of a target vehicle frame and wherein material is removed from the first side of said third, fourth, fifth or such, billet such that at least one faying surface is left on said first side of said third, fourth, fifth or such, billet adjacent to the third, fourth, fifth or such, inner shape.

The scope of the invention is determined by the attached claims together with the equivalents thereof. The skilled persons will again appreciate the fact that the disclosed embodiments were constructed for illustrative purposes only, and the innovative fulcrum reviewed herein will cover further embodiments, embodiment combinations, variations and equivalents that better suit each particular use case of the invention.

The invention claimed is:

1. A method for manufacturing a hollow vehicle frame part comprising
 removing material from a first side of a first billet to create a first inner shape of a target vehicle frame and wherein material is removed from the first side of said first billet such that at least one substantially angled faying surface is left on said first side of said first billet adjacent to the first inner shape,
 removing material from a first side of a second billet to create a second inner shape of a target vehicle frame and wherein material is removed from the first side of said second billet such that at least one substantially angled faying surface is left on said first side of said second billet adjacent to the second inner shape,
 bonding the first billet the second billet together at the faying t sides of the first billet and second billet such that the first inner shape and second inner shape face each other and such that the angled faying surfaces together form a bevel-type joint,
 after bonding, removing material by machining from the second side of the first billet and from the second side of the second billet to create target outer shape of the vehicle frame part.

2. The method of claim 1, wherein material is removed from the first sides of the first billet and second billet such that an amount of material remains in the second sides of the first billet and second billet before bonding and removing material from the second sides of the first billet and second billet.

3. The method of claim 1, wherein material is removed from the first sides of the first billet and second billet such that an amount of material remains outside of the faying surfaces on the first sides of the first billet and second billet before bonding and removing material from the second sides of the first billet and second billet.

4. The method of claim 1, wherein material is removed from the first sides and second sides of the first billet and second billet such that the target shape of the vehicle frame part has a wall thickness of 0.1-8 mm.

5. The method of claim 1, wherein material is removed from the first sides and second sides of the first billet and second billet such that the target shape of the vehicle frame part has a wall thickness of approximately 1 millimeter.

6. The method of claim 1, wherein at or after bonding the combined block of the first billet and the second billet is attached to a jig for machining any of the second sides of the first billet and second billet.

7. The method of claim 1, wherein the first billet and/or second billet are pre-formed by cold-forging or printing to form a first inner shape and/or second inner shape, after which the first inner shape and/or second inner shape are machined.

8. The method of claim 1, wherein the first side of the first billet and/or the first side of the second billet are shot-peened after forming the inner shapes.

9. The method of claim 1, wherein the first inner shape and/or second inner shape surfaces are treated by coating, anodizing, coloring or passivating.

10. The method of claim 1, wherein mechanical fastening means through the first billet and second billet at non-machined parts of the first billet and second billet are used for setting and holding the first billet and second billet in relation to each other for bonding.

11. The method of claim 1, wherein mechanical fastening means are used to fasten any of the billets to a jig for machining.

12. The method of claim 1, wherein xyz-coordinate zero points and their relation to one or more sides of a billet and inner shape geometry are determined for each inner shape at or after forming each inner shape.

13. The method of claim 1, wherein the billets are aluminum alloy billets.

14. The method of claim 1, comprising one or more of third, fourth, fifth . . . billets wherein removing material from a first side of a third, fourth, fifth or such billet, which first side is substantially flat, to create third, fourth, fifth such inner shape of a target vehicle frame and wherein material is removed from the first side of said third, fourth, fifth or such billet such that at least one faying surface is left on said first side of said third, fourth, fifth or such billet adjacent to the third, fourth, fifth or such inner shape.

15. A method of manufacturing a bicycle frame part, comprising:
 performing the method of claim 1, wherein the hollow vehicle frame part is the bicycle frame part.

* * * * *